US012752280B2

(12) United States Patent
Wang et al.

(10) Patent No.: US 12,752,280 B2
(45) Date of Patent: Oct. 6, 2026

(54) COAL WATER SLURRY CONCENTRATION DEVICE

(71) Applicant: Anhui University of Science and Technology, Huainan (CN)

(72) Inventors: Changji Wang, Huainan (CN); Hanxu Li, Huainan (CN); Yuanyuan Zhu, Huainan (CN); Tianlong Wen, Huainan (CN); Fangwu Chen, Huainan (CN); Jiantang Zhang, Huainan (CN)

(73) Assignee: Anhui University of Science and Technology, Huainan (CN)

( * ) Notice: Subject to any disclaimer, the term of this patent is extended or adjusted under 35 U.S.C. 154(b) by 317 days.

(21) Appl. No.: 18/617,727

(22) Filed: Mar. 27, 2024

(65) Prior Publication Data

US 2024/0226906 A1 Jul. 11, 2024

Related U.S. Application Data

(63) Continuation of application No. PCT/CN2022/116545, filed on Sep. 1, 2022.

(30) Foreign Application Priority Data

Aug. 18, 2022 (CN) ......................... 202210994396.0

(51) Int. Cl.
*B02C 4/36* (2006.01)
*B02C 4/04* (2006.01)
(Continued)

(52) U.S. Cl.
CPC .................. *B02C 4/36* (2013.01); *B02C 4/04* (2013.01); *B02C 4/42* (2013.01); *C10L 1/326* (2013.01)

(58) Field of Classification Search
CPC .... B02C 4/36; B02C 4/04; B02C 4/42; B02C 4/32; B02C 23/08; B02C 23/10; B02C 23/14; B02C 23/16; C10L 1/326
(Continued)

(56) References Cited

U.S. PATENT DOCUMENTS 4,770,352 A 9/1988 Takamoto

FOREIGN PATENT DOCUMENTS

CN 1751811 3/2006
CN 2871016 2/2007
(Continued)

OTHER PUBLICATIONS

CN-105665621-A machine translation (Year: 2016).*
(Continued)

*Primary Examiner* — Christopher L Templeton
*Assistant Examiner* — Teresa A Guthrie
(74) *Attorney, Agent, or Firm* — Pilloff Passino & Cosenza LLP; Rachel Pilloff; Sean Passino

(57) ABSTRACT

Provided is a concentration device for coal water slurry, belonging to the technical field of coal water slurry preparation equipment, including a grinding shell, where a grinding mechanism is connected in the grinding shell. A lower part of the grinding shell is connected to a filter unit, where the filter unit is correspondingly arranged with a discharge port of the grinding mechanism. A lower part of the filter unit is correspondingly provided with a pulverized coal particle size distribution mechanism. An outlet end of the pulverized coal particle size distribution mechanism is communicated with a stirrer. The grinding mechanism includes a first bracket, where the first bracket is fixedly connected to inner side walls of the grinding shell. The first bracket is connected with step-by-step grinding units, a first adjusting unit and two second adjusting units.

7 Claims, 5 Drawing Sheets

(51) Int. Cl.
*B02C 4/42* (2006.01)
*C10L 1/32* (2006.01)

(58) Field of Classification Search
USPC .......................................................... 241/107
See application file for complete search history.

(56) References Cited

FOREIGN PATENT DOCUMENTS

| | | | |
|---|---|---|---|
| CN | 102527469 | 7/2012 | |
| CN | 103206718 | 7/2013 | |
| CN | 103894344 | 7/2014 | |
| CN | 203803556 | 9/2014 | |
| CN | 105665621 A * | 6/2016 | ............... B22C 5/00 |
| CN | 106733081 | 5/2017 | |
| CN | 208055279 | 11/2018 | |
| CN | 208390168 | 1/2019 | |
| CN | 208840183 | 5/2019 | |
| CN | 210303503 | 4/2020 | |
| CN | 210434588 | 5/2020 | |
| CN | 211563123 | 9/2020 | |
| CN | 212468222 | 2/2021 | |
| CN | 212524477 | 2/2021 | |
| CN | 212595928 | 2/2021 | |
| CN | 213408987 | 6/2021 | |
| CN | 113413960 | 9/2021 | |
| CN | 113926532 | 1/2022 | |
| CN | 114752419 | 7/2022 | |
| JP | 2005081162 | 3/2005 | |

OTHER PUBLICATIONS

CN-208055279-U machine translation (Year: 2018).*
CN-211563123-U machine translation (Year: 2020).*
CN-212524477-U machine translation (Year: 2021).*
First Office action from SIPO dated May 26, 2023 in application 202210994396.0.
Sun Zhen, et al. , A New Type of Bionic Rodent Bone Crusher, Light Industry Machinery, vol. 34, No. 9, Dec. 2016, pp. 90-97 (abstract translated).
Deng Yexzin, Research on improving the slurryability of Shenhua coal by particle grading, Dissertation in Chem. engineering in Anhui University of Science and Technology Jun. 13, 2018 (abstract and contents translated).

* cited by examiner

COAL WATER SLURRY CONCENTRATION DEVICE

This disclosure is a continuation of PCT/CN2022/116545, filed on Sep. 1, 2022 and claims priority of Chinese Patent Application No. 202210994396.0, filed on Aug. 18, 2022, the contents of which are hereby incorporated by reference.

TECHNICAL FIELD

The disclosure belongs to the technical field of coal water slurry preparation equipment, and in particular to a concentration device for coal water slurry.

BACKGROUND

Under the same fluidity, due to the reduction of water quantity, a lot of latent heat and sensible heat of gasification of water vapor are saved. No matter for a gasification or combustion process, the higher the concentration of coal water slurry, the greater the oxygen consumption, and the higher the gasification or combustion efficiency, leading to a better energy-saving effect. Mixing pulverized coal with different particle size ranges is helpful to form coal water slurry with stable concentration. In addition, at present, when preparing the coal water slurry, a preparation process using a wet overflow rod mill with high energy consumption is often selected, that is, coal samples with particle sizes greater than 10 mm enter the rod mill for grinding and pulping at the same time with pulping water and additives. Although wet pulping has advantages of low labour intensity and little environmental pollution, it requires that feeding concentration should not change too much and particle sizes are unstable, so it is impossible to quickly select pulverized coal with suitable particle sizes for mixing. Therefore, it is urgent to develop a concentration device for coal water slurry capable of quickly separating pulverized coal with a suitable particle size range and effectively improving the concentration of the coal water slurry.

SUMMARY

An objective of the disclosure is to provide a concentration device for coal water slurry to solve above problems and achieve an objective of effective concentration.

In order to achieve the above objective, the disclosure provides a following scheme. A concentration device for coal water slurry includes a grinding shell, where a grinding mechanism is connected in the grinding shell. A lower part of the grinding shell is connected to a filter unit, where the filter unit is correspondingly arranged with a discharge port of the grinding mechanism. A lower part of the filter unit is correspondingly provided with a pulverized coal particle size distribution mechanism, where the pulverized coal particle size distribution mechanism is used for separating pulverized coal with different particle sizes. An outlet end of the pulverized coal particle size distribution mechanism is communicated with a stirrer, and the stirrer is used for stirring the pulverized coal with different particle sizes into the coal water slurry.

The grinding mechanism includes a first bracket, where the first bracket is fixedly connected to inner side walls of the grinding shell. The first bracket is connected with a step-by-step grinding unit, a first adjusting unit and two second adjusting units. The first adjusting unit is connected between the step-by-step grinding unit and the first bracket, and the two second adjusting units are correspondingly arranged at bottoms of two sides of the step-by-step grinding unit respectively. The first adjusting unit is used for synchronously adjusting a grinding gap of the step-by-step grinding unit, and the two second adjusting units are used for unifying the grinding gap of the step-by-step grinding unit.

Optionally, the step-by-step grinding unit includes two second brackets and two fourth brackets, where the two second brackets are fixedly connected to the first bracket respectively, and the two fourth brackets are slidably connected to the first bracket. The first adjusting unit is connected between the two fourth brackets and the first bracket. Two first grinding rollers and two second grinding rollers are vertically connected between the two second brackets and between the two fourth brackets respectively, and the two first grinding rollers and the two second grinding rollers are connected with driving parts in a transmission way respectively. The driving parts are fixedly connected to the second brackets and the fourth brackets, and the second adjusting units are connected to the two first grinding rollers located at lower parts of the second brackets and lower parts of the fourth brackets. The two second grinding rollers located at a lower part of the first bracket are arranged corresponding to a top of the filter unit.

Optionally, each of the second adjusting units includes a first servo motor, where the first servo motor is fixedly connected to a bottom of the first bracket. A first sliding adjusting part is arranged between the second brackets and corresponding one of the first grinding rollers located at the lower parts of the second brackets, and a second sliding adjusting part is arranged between the fourth brackets and corresponding one of the second grinding rollers located at the lower parts of the fourth brackets. The first servo motor drives the first sliding adjusting part and the second sliding adjusting part through a lead screw.

Optionally, the first sliding adjustment part includes a first cavity and two second chutes, where the first cavity is opened in bottoms of the second brackets, and the two second chutes are respectively opened on bottom surfaces and side surfaces of the second brackets. The first cavity is communicated with the two second chutes, and a first slider is slidably connected in the first cavity. A bottom of the first slider passes through one of the second chutes and is also fixedly connected with a first sleeve. A rotating shaft of the corresponding one of the first grinding rollers located at the lower parts of the second bracket passes through an other of the second chutes and is also rotatably connected with the first slider, and the rotating shaft of the corresponding one of the first grinding rollers passes through the first slider and is also connected with corresponding one of the driving parts in a transmission way. The first sleeve is threaded and sleeved outside the lead screw, and one end of the lead screw is coaxially and fixedly connected with a rotating shaft of the first servo motor.

Optionally, the second sliding adjustment part includes a second cavity and two third chutes, where the second cavity is arranged in bottoms of the fourth brackets, and the two third chutes are respectively arranged on bottom surfaces and side surfaces of the fourth brackets. The second cavity is communicated with the two third chutes, a second slider is slidably connected in the second cavity. A bottom of the second slider passes through one of the third chutes and is also fixedly connected with a second sleeve. A rotating shaft of corresponding one of the first grinding rollers located at the lower parts of the fourth bracket passes through an other of the third chutes and is also rotatably connected with the second slider, and the rotating shaft of the corresponding one of the first grinding rollers passes through the second slider and is also connected with corresponding one of the driving parts in a transmission way. The second sleeve is sleeved outside the lead screw, and a transmission assembly is arranged between the second sleeve and the lead screw.

Optionally, the transmission assembly includes a third sleeve, where the third sleeve is axially slidably sleeved at one end of the lead screw, and the second sleeve is threadedly sleeved at an outer side of the third sleeve.

Optionally, the pulverized coal particle size distribution mechanism includes a third bracket, and a distribution shell is fixedly connected to the third bracket. One end of the distribution shell is fixedly connected with a fan, a top of the end of the distribution shell close to the fan is correspondingly arranged below the filter unit, and an other end of the distribution shell is fixedly connected with a filter. An airflow channel is formed in the distribution shell, and the fan and the filter are communicated through the airflow channel. A distribution box is fixedly connected to a bottom of an outer side of the distribution shell, and a plurality of pulverized coal troughs are sequentially arranged in the distribution box along a direction of the airflow channel. The plurality of pulverized coal troughs are respectively communicated with a bottom of the airflow channel, and bottoms of the plurality of the pulverized coal troughs are respectively communicated with discharging assemblies.

Optionally, each of the discharging assemblies includes a discharging pipe. The discharging pipe is vertically and fixedly communicated with a bottom of the distribution box, and a bottom end of the discharging pipe is fixedly connected with a second servo motor. A rotating shaft of the second servo motor penetrates into the discharging pipe and also fixedly penetrates a spiral stirring blade, and one side of a bottom of the discharging pipe is communicated with the stirrer.

Optionally, sizes of the plurality of pulverized coal troughs increase in turn along a direction from the fan to the filter. A bottom of one end of the distribution box close to the filter is provided with a water tank.

Optionally, the first adjusting unit includes a servo hydraulic cylinder. One end of the servo hydraulic cylinder is fixedly connected to the first bracket, an other end of the servo hydraulic cylinder is fixedly connected between the two fourth brackets. One side of each of the fourth brackets close to the servo hydraulic cylinder is fixedly connected with a sliding column. The sliding column is slidably connected with the first bracket, and a sliding direction of the first bracket is parallel to a telescopic direction of the servo hydraulic cylinder.

The disclosure has following technical effects. A main function of the step-by-step grinding units is to crush coal blocks step by step from large to small. A main function of the filter unit is to filter crushed pulverized coal particles, collect pulverized coal with large particles, and crush the pulverized coal again. A main function of the first adjusting unit is to reduce the grinding gaps between the step-by-step grinding units, and filtered pulverized coal with large particles is ground and crushed. A main function of the second adjusting unit is to unify the grinding gaps between the step-by-step grinding units, so that all the grinding gaps have a same size, which is convenient for repeatedly grinding and crushing the filtered pulverized coal with large particles, thus increasing a grinding time of the pulverized coal to a certain extent, thereby obtaining more pulverized coal meeting particle size requirements. A main function of the stirrer is to add a proper amount of water and additives into the pulverized coal with different particle sizes, and finally stir a mixture into qualified coal water slurry. A main function of the pulverized coal particle size distribution mechanism is to distinguish the pulverized coal with different particle sizes, so as to facilitate mixing of the pulverized coal with an appropriate particle size range, achieve a purpose of fully adsorbing pulverized coal with small particles in gaps of large particles, and ultimately help to form high-concentration coal water slurry. In this disclosure, pulverized coal with a qualified particle size is prepared by dry grinding, and a goal of effectively improving concentration of coal water slurry is finally achieved by sorting the pulverized coal with a best particle size range.

BRIEF DESCRIPTION OF THE DRAWINGS

In order to explain technical schemes of the disclosure or technical schemes in the prior art more clearly, drawings needed in embodiments are briefly introduced below. Obviously, the drawings in a following description are only some embodiments of the disclosure. For ordinary people in the field, other drawings may be obtained according to these drawings without paying a creative labor.

DETAILED DESCRIPTION OF THE EMBODIMENTS

In the following, technical schemes in embodiments of the disclosure may be clearly and completely described with reference to attached drawings. Obviously, the described embodiments are only a part of the embodiments of the disclosure, but not all embodiments. Based on the embodiments in the disclosure, all other embodiments obtained by ordinary technicians in the field without a creative labour belong to a scope of protection of the disclosure.

In order to make above objects, features and advantages of the disclosure more obvious and easier to understand, the disclosure may be further described in detail with the attached drawings and specific embodiments.

Figure 1:
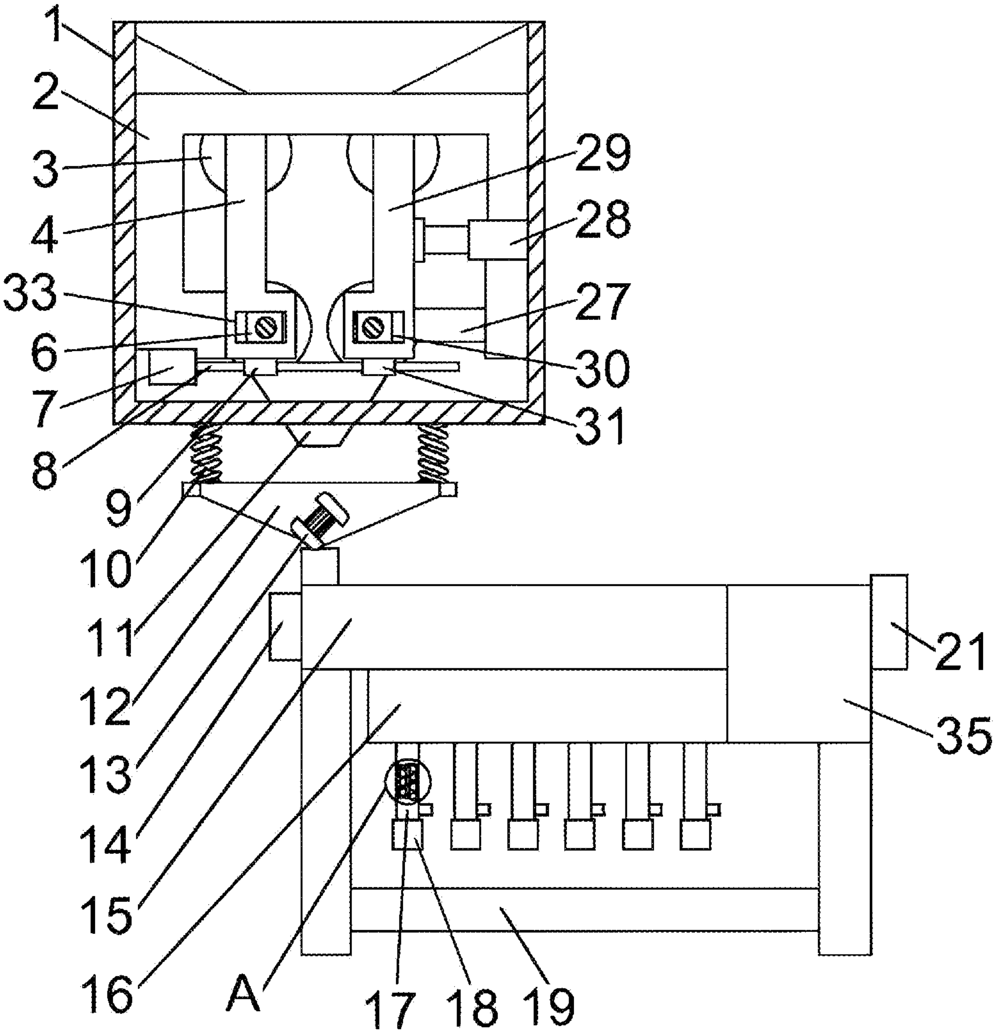
FIG. 1 is a schematic diagram of a front view direction of a concentration device for coal water slurry according to the disclosure.
Figure 2:
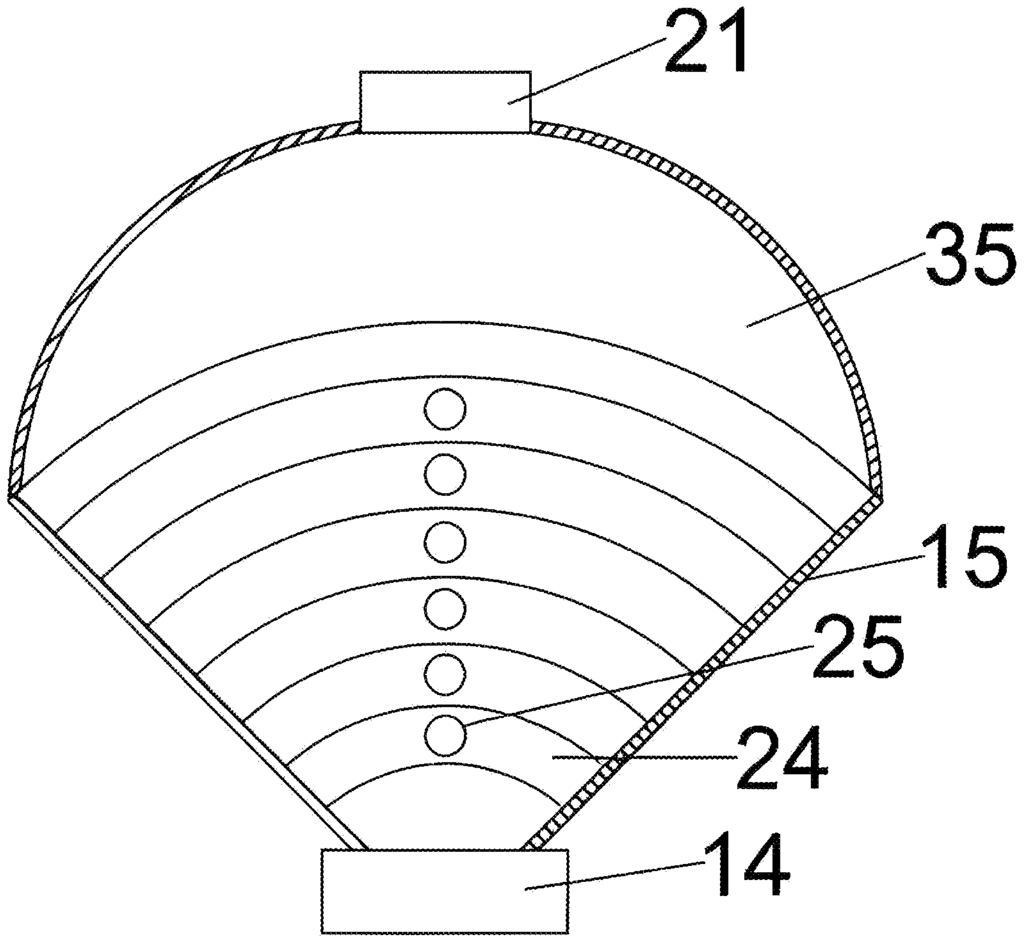
FIG. 2 is a schematic diagram of an interior of a distribution shell according to the disclosure.
Figure 3:
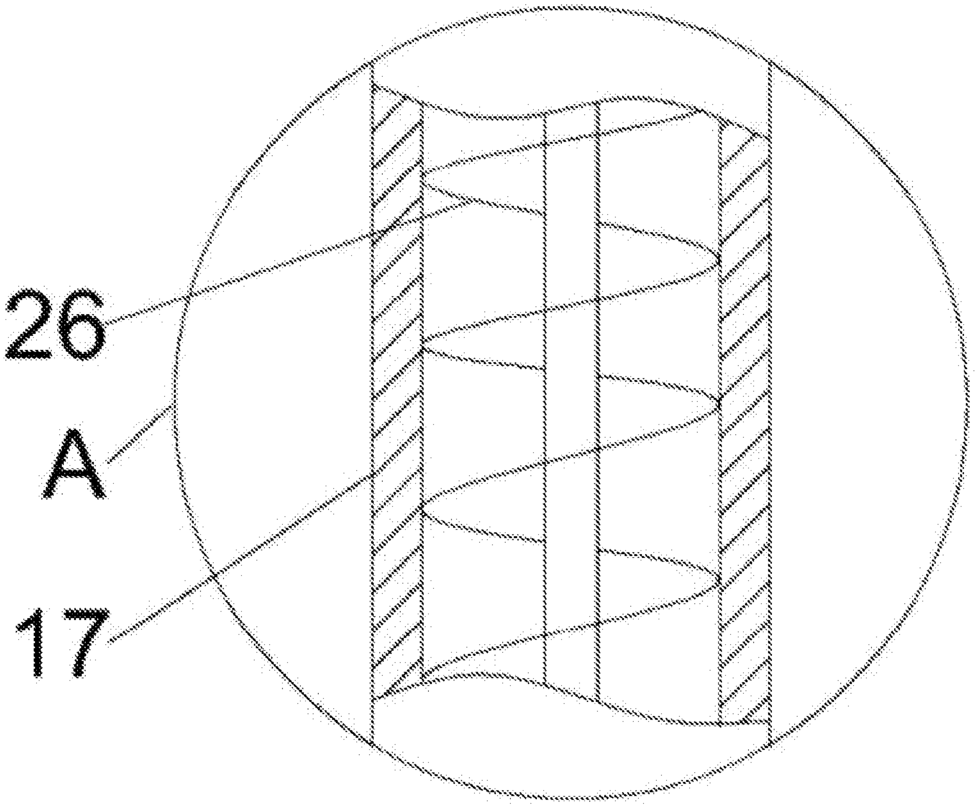
FIG. 3 is an enlarged view of part A in FIG. 1.
Figure 4:
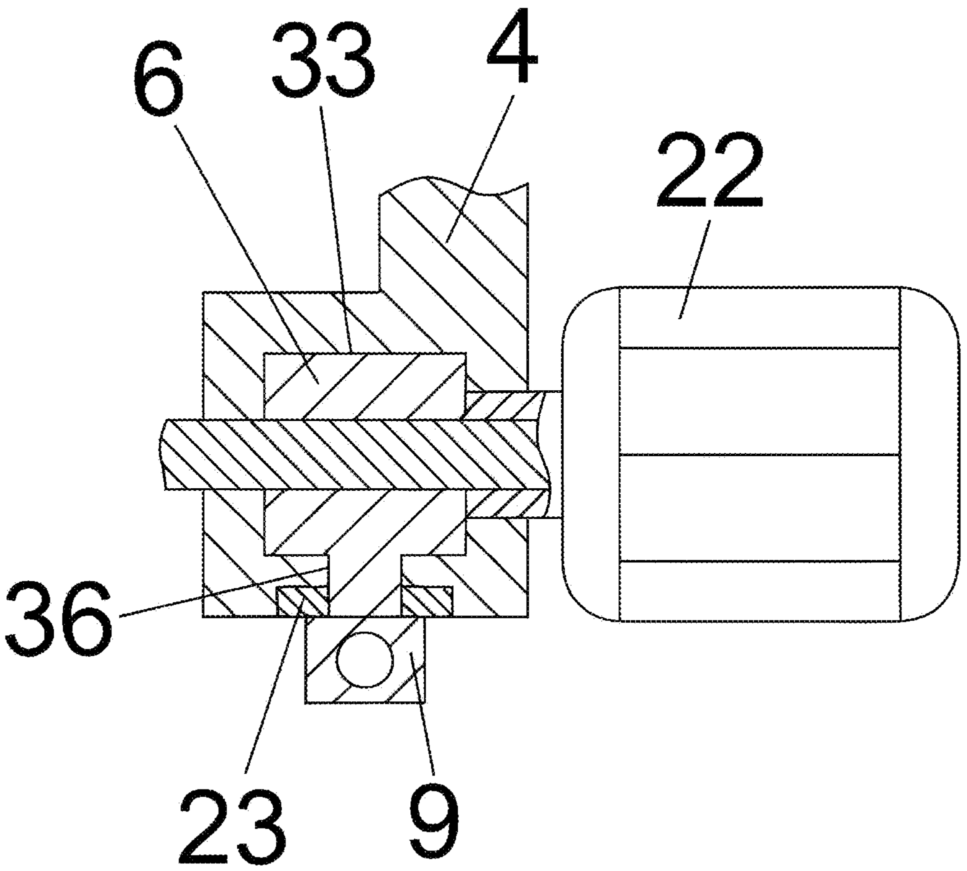
FIG. 4 is a schematic diagram of a connection relationship between a first slider and a first cavity according to the disclosure.
Figure 5:
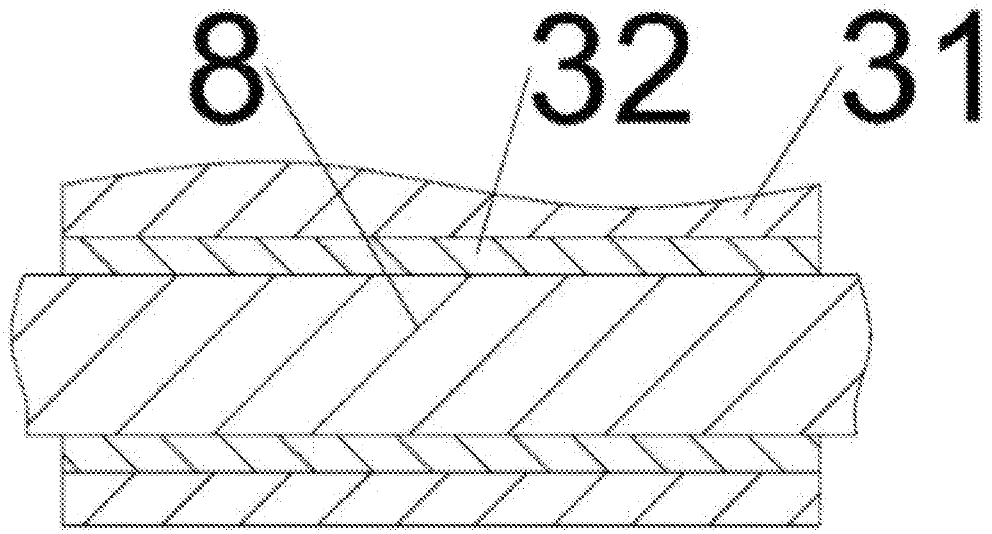
FIG. 5 is a schematic diagram of a connection state of a third sleeve according to the disclosure.

With reference to FIGS. 1-5, the disclosure provides a concentration device for coal water slurry, including a grinding shell 1, where a grinding mechanism is connected in the grinding shell 1. A lower part of the grinding shell 1 is connected to a filter unit, where the filter unit is correspondingly arranged with a discharge port of the grinding mechanism. A lower part of the filter unit is correspondingly provided with a pulverized coal particle size distribution mechanism, where the pulverized coal particle size distribution mechanism is used for separating pulverized coal with different particle sizes. An outlet end of the pulverized coal particle size distribution mechanism is communicated with a stirrer, and the stirrer is used for stirring the pulverized coal with different particle sizes into the coal water slurry.

The grinding mechanism includes a first bracket 2, where the first bracket 2 is fixedly connected to inner side walls of the grinding shell 1. The first bracket 2 is connected with a step-by-step grinding unit, a first adjusting unit and two second adjusting units. The first adjusting unit is connected between the step-by-step grinding units and the first bracket 2, and the two second adjusting unit are correspondingly arranged at bottoms of two sides of the step-by-step grinding unit respectively. The first adjusting unit is used for synchronously adjusting a grinding gap of the step-by-step grinding unit, and the two second adjusting units are used for unifying the grinding gap of the step-by-step grinding unit.

A main function of the step-by-step grinding units is to crush coal blocks step by step from large to small. A main function of the filter unit is to filter crushed pulverized coal particles, collect pulverized coal with large particles, and crush the pulverized coal again. A main function of the first adjusting unit is to reduce the grinding gaps between the step-by-step grinding units, and filtered pulverized coal with large particles is ground and crushed. A main function of the second adjusting unit is to unify the grinding gaps between the step-by-step grinding units, so that all the grinding gaps have a same size, which is convenient for repeatedly grinding and crushing the filtered pulverized coal with large particles, thus increasing a grinding time of the pulverized coal to a certain extent, thereby obtaining more pulverized coal meeting particle size requirements. A main function of the stirrer is to add a proper amount of water and additives into the pulverized coal with different particle sizes, and finally stir a mixture into qualified coal water slurry. A main function of the pulverized coal particle size distribution mechanism is to distinguish the pulverized coal with different particle sizes, so as to facilitate mixing of the pulverized coal with an appropriate particle size range, achieve a purpose of fully adsorbing pulverized coal with small particles in gaps of large particles, and ultimately help to form high-concentration coal water slurry. In this disclosure, pulverized coal with a qualified particle size is prepared by dry grinding, and a goal of effectively improving concentration of coal water slurry is finally achieved by sorting the pulverized coal with a best particle size range.

In an embodiment, the step-by-step grinding unit includes two second brackets 4 and two fourth brackets 29, where the two second brackets 4 are fixedly connected to the first bracket 2 respectively, and the two fourth brackets 29 are slidably connected to the first bracket 2. The first adjusting unit is connected between the two fourth brackets 29 and the first bracket 2. Two grinding rollers 3 are vertically connected between the two second brackets 4 and between the two fourth brackets 29 respectively, and four the grinding rollers 3 are connected with driving parts in a transmission way. The driving parts are fixedly connected to the second brackets 4 and the fourth brackets 29, and the second adjusting units are connected to the two grinding rollers 3 located at lower parts of the second brackets 4 and lower parts of the fourth brackets 29. The two grinding rollers 3 located at a lower part of the first bracket 2 are arranged corresponding to a top of the filter unit.

In an initial state, a grinding gap between two grinding rollers 3 located at upper parts is larger than a grinding gap between the two grinding rollers 3 located at the lower parts. Large coal blocks are first broken into small pieces, and then further broken. In a process of repeated crushing, the pulverized coal with small particles is continuously produced and passes through the filter unit, and filtered large particles are ground again. With sizes of the coal blocks decreasing, the grinding gaps are adjusted synchronously by the first adjusting unit to meet grinding requirements. As the sizes of the coal blocks are stable, upper and lower grinding gaps are unified by the second adjusting units, so that a grinding time of the coal blocks is increased to a certain extent, and more pulverized coal is obtained.

In an embodiment, each of the second adjusting units includes a first servo motor 7, where the first servo motor 7 is fixedly connected to a bottom of the first bracket 2. A first sliding adjusting part is arranged between the second brackets 4 and corresponding one of the grinding rollers 3 located at the lower parts of the second brackets 4, and a second sliding adjusting part is arranged between the fourth brackets 29 and corresponding one of the grinding rollers 3 located at the lower parts of the fourth brackets 29. The first servo motor 7 drives the first sliding adjusting part and the second sliding adjusting part through a lead screw 8.

When the upper and lower grinding gaps need to be unified, the first servo motors 7 are started to drive the lead screw 8 synchronously, and then the first sliding adjustment part and the second sliding adjustment part are driven to realize adjustment of the grinding gap between the two grinding rollers 3 located at the lower parts, thus ensuring consistency of the upper and lower grinding gaps.

In an embodiment, the first sliding adjustment part includes a first cavity 33 and two second chutes 36, where the first cavity 33 is opened in bottoms of the second brackets 4, and the two second chutes 36 are respectively opened on bottom surfaces and side surfaces of the second brackets 4. The first cavity 33 is communicated with the two second chutes 36, and a first slider 6 is slidably connected in the first cavity 33. A bottom of the first slider 6 passes through one of the two second chutes 36 and is also fixedly connected with a first sleeve 9. A rotating shaft of the corresponding one of the grinding rollers 3 located at the lower parts of the second bracket 4 passes through an other of the two second chutes 36 and is also rotatably connected with the first slider 6, and the rotating shaft of the corresponding one of the grinding rollers 3 passes through the first slider 6 and is also connected with corresponding one of the driving parts in a transmission way. The first sleeve 9 is threaded and sleeved outside the lead screw 8, and one end of the lead screw 8 is coaxially and fixedly connected with a rotating shaft of the first servo motor 7.

Specifically, two first servo motors 7 drive the first slider 6 to slide in the first cavity 33 through the lead screw 8, and drive the corresponding one of the grinding rollers 3 located at the lower parts of the second bracket 4 to approach or leave the fourth brackets 29, that is, the grinding gap is narrowed or increased, so as to grind pulverized coal with different particle sizes.

In an embodiment, the second sliding adjustment part includes a second cavity and two third chutes, where the second cavity is arranged in bottoms of the fourth brackets 29, and the two third chutes are respectively arranged on bottom surfaces and side surfaces of the fourth brackets 29. The second cavity is communicated with the two third chutes, a second slider 30 is slidably connected in the second cavity. A bottom of the second slider 30 passes through one of the two third chutes and is also fixedly connected with a second sleeve 31. A rotating shaft of corresponding one of the grinding rollers 3 located at the lower parts of the fourth bracket 29 passes through an other of the two third chutes and is also rotatably connected with the second slider 30, and the rotating shaft of the corresponding one of the grinding rollers 3 passes through the second slider 30 and is also connected with corresponding one of the driving parts in a transmission way. The second sleeve 31 is sleeved outside the lead screw 8, and a transmission assembly is arranged between the second sleeve 31 and the lead screw 8.

Specifically, the two first servo motors 7 drive the second slider 30 to slide in the second cavity through the lead screw 8 and the transmission assembly, and drive the corresponding one of the grinding rollers 3 located at the lower parts of the fourth brackets 29 to approach or be away from the second brackets 4, that is, the grinding gap is reduced or increased, so that pulverized coal with different particle sizes may be ground.

In an embodiment, the transmission assembly includes a third sleeve 32, where the third sleeve 32 is axially slidably sleeved at one end of the lead screw 8, and the second sleeve 31 is threadedly sleeved at an outer side of the third sleeve 32.

In an embodiment, the pulverized coal particle size distribution mechanism includes a third bracket 19, and a distribution shell 15 is fixedly connected to the third bracket 19. One end of the distribution shell 15 is fixedly connected with a fan 14, a top of the end of the distribution shell 15 close to the fan 14 is correspondingly arranged below the filter unit, and an other end of the distribution shell 15 is fixedly connected with a filter 21. An airflow channel is formed in the distribution shell 15, and the fan 14 and the filter 21 are communicated through the airflow channel. A distribution box 16 is fixedly connected to a bottom of an outer side of the distribution shell 15, and a plurality of pulverized coal troughs 24 are sequentially arranged in the distribution box 16 along a direction of the airflow channel. The plurality of pulverized coal troughs 24 are respectively communicated with a bottom of the airflow channel, and bottoms of the plurality of the pulverized coal troughs 24 are respectively communicated with discharging assemblies.

By starting the fan 14 and setting a fixed wind force, the pulverized coal permeated from the filter unit is blown into the airflow channel by the fan 14. According to the pulverized coal with different particle sizes, pulverized coal with a large mass falls into the pulverized coal troughs 24 near an inlet of the airflow channel and pulverized coal with a small mass falls into the pulverized coal trough 24 near an outlet of the airflow channel, so that the pulverized coal with different particle sizes may be effectively distinguished, and the pulverized coal with appropriate particle size ranges may be selected and mixed more quickly and effectively, which is helpful to achieve an effect that the pulverized coal with small particles is adsorbed in the gaps of the pulverized coal with large particles.

In an embodiment, each of the discharging assemblies includes a discharging pipe 17. The discharging pipe 17 is vertically and fixedly communicated with a bottom of the distribution box 16, and a bottom end of the discharging pipe 17 is fixedly connected with a second servo motor 18. A rotating shaft of the second servo motor 18 penetrates into the discharging pipe 17 and also fixedly penetrates a spiral stirring blade 26, and one side of a bottom of the discharging pipe 17 is communicated with the stirrer.

The pulverized coal with different particle sizes sorted by the fan 14 is continuously accumulated in the pulverized coal troughs 24, enters blanking holes 25. Then, the spiral stirring blades 26 are driven by the second servo motors 18 to convey the pulverized coal into the stirrer. The stirrer adopts the prior art, and the pulverized coal with different particle sizes are mixed by the stirrer, and a proper amount of water and additives are added. The pulverized coal or water or additives are continuously added in a process of continuous stirring to form coal water slurry with partial shear requirements and concentration.

In an embodiment, sizes of the plurality of pulverized coal troughs 24 increase in turn along a direction from the fan 14 to the filter 21. A bottom of one end of the distribution box 16 close to the filter 21 is provided with a water tank 35.

No matter how the grinding gaps are adjusted, during each grinding process, a large amount of pulverized coal always permeates through the filter unit and falls into the airflow channel. An amount of this part of pulverized coal is continuously accumulated, and an output will be greater than that of the pulverized coal with large particles. Therefore, sizes of the pulverized coal troughs 24 for storing the pulverized coal with small particles are relatively large. In addition, water is added into the water tank 35 to continuously collect the pulverized coal that does not fall into the pulverized coal troughs 24, and finally a turbid pulverized coal solution is formed, and this part of solution may be added into the stirrer to avoid waste. The filter 21 is the prior art, which may filter the pulverized coal in the air that may not be collected in the airflow channel, so as to avoid affecting an environment.

In an embodiment, the first adjusting unit includes a servo hydraulic cylinder 28. One end of the servo hydraulic cylinder 28 is fixedly connected to the first bracket 2, an other end of the servo hydraulic cylinder 28 is fixedly connected between the two fourth brackets 29. One side of each of the fourth brackets 29 close to the servo hydraulic cylinder 28 is fixedly connected with a sliding column 27. The sliding column 27 is slidably connected with the first bracket 2, and a sliding direction of the first bracket 2 is parallel to a telescopic direction of the servo hydraulic cylinder 28.

In an embodiment, the filter unit includes a vibrating screen 12, where four corners of a top of the vibrating screen 12 are respectively fixedly connected with springs 10, and one side of the vibrating screen 12 is fixedly connected with a vibrating motor 13.

After the coal blocks and the pulverized coal falling from a hopper 11 are filtered by the vibrating screen 12, the pulverized coal in the coal blocks may be filtered out, which is convenient for further distinguishing the pulverized coal with different particle sizes. It is also convenient for the coal blocks to be added into the step-by-step grinding units for continuous grinding through manual operation.

In an embodiment, the driving parts include four third servo motors 22, where lower two third servo motors 22 are fixedly connected to the first slider 6 and the second slider 30 respectively, and rotating shafts of the lower two third servo motors 22 are fixedly connected to the two grinding rollers 3 through the first slider 6 and the second slider 30 respectively.

In an embodiment, electromagnets 23 are fixedly connected to the bottoms of the second bracket 4 and the fourth bracket 29, respectively. The electromagnets 23 are respectively attracted to the first slider 6 and the second slider 30 after being electrified, so that the first slider 6 and the second slider 30 may be more stable, thus ensuring working stability of the grinding rollers 3 during grinding.

In a description of the disclosure, it should be understood that terms “vertical”, “horizontal”, “up”, “down”, “front”, “back”, “left”, “right”, “vertical”, “horizontal”, “top”, “bottom”, “inside”, “outside”, and other indications of orientation or positional relationships are based on orientation or positional relationships shown in accompanying drawings, solely for a convenience of describing the disclosure, rather than indicating or implying that a device or a component referred to must have a specific orientation, be constructed and operated in a specific orientation, therefore it may not be understood as a limitation of the disclosure.

The above-mentioned embodiments only describe preferred modes of the disclosure, and do not limit the scope of the disclosure. Under a premise of not departing from a design spirit of the disclosure, various modifications and improvements made by ordinary technicians in the field to the technical scheme of the disclosure shall fall within a protection scope determined by claims of the disclosure.

What is claimed is:

1. A concentration device for coal water slurry, comprising a grinding shell, wherein a grinding mechanism is connected in the grinding shell; a lower part of the grinding shell is connected to a filter unit, and the filter unit is correspondingly arranged with a discharge port of the grinding mechanism; a lower part of the filter unit is correspondingly provided with a pulverized coal particle size distribution mechanism, and the pulverized coal particle size distribution mechanism comprises a distribution shell fixedly connected with a fan and a filter, between which an airflow channel is formed, and a distribution box with a plurality of pulverized coal troughs for separating pulverized coal with different particle sizes; an outlet end of the pulverized coal particle size distribution mechanism is communicated with a stirrer, and the stirrer is used for stirring the pulverized coal with different particle sizes into the coal water slurry; and the grinding mechanism comprises a first bracket, wherein the first bracket is fixedly connected to inner side walls of the grinding shell; the first bracket is connected with a step-by-step grinding unit, a first adjusting unit and two second adjusting units; the first adjusting unit is connected between the step-by-step grinding unit and the first bracket, and the two second adjusting units are arranged at bottoms of two sides of the step-by-step grinding unit respectively; the first adjusting unit comprises a servo hydraulic cylinder for synchronously adjusting a grinding gap of the step-by-step grinding unit, and the two second adjusting units are used for unifying the grinding gap of the step-by-step grinding unit;

wherein the step-by-step grinding unit comprises two second brackets and two fourth brackets; the two second brackets are fixedly connected to the first bracket respectively, and the two fourth brackets are slidably connected to the first bracket; the first adjusting unit is connected between the two fourth brackets and the first bracket; two first grinding rollers and two second grinding rollers are vertically connected between the two second brackets and between the two fourth brackets respectively, and the two first grinding rollers and the two second grinding rollers are connected with driving parts in a transmission way respectively; the driving parts are fixedly connected to the second brackets and the fourth brackets, and the second adjusting units are connected to the two first grinding rollers located at lower parts of the second brackets and lower parts of the fourth brackets; and the two second grinding rollers located at a lower part of the first bracket are arranged corresponding to a top of the filter unit;

each of the second adjusting units comprises a first servo motor; the first servo motor is fixedly connected to a bottom of the first bracket; a first sliding adjusting part is arranged between the second brackets and corresponding one of the first grinding rollers located at the lower parts of the second brackets, and a second sliding adjusting part is arranged between the fourth brackets and corresponding one of the second grinding rollers located at the lower parts of the fourth brackets; and the first servo motor drives the first sliding adjusting part and the second sliding adjusting part through a lead screw; and the first sliding adjustment part comprises a first cavity and two second chutes, wherein the first cavity is opened in bottoms of the second brackets, and the two second chutes are respectively opened on bottom surfaces and side surfaces of the second brackets; the first cavity is communicated with the two second chutes, and a first slider is slidably connected in the first cavity; a bottom of the first slider passes through one of the second chutes and is also fixedly connected with a first sleeve; a rotating shaft of the corresponding one of the first grinding rollers located at the lower parts of the second bracket passes through an other of the second chutes and is also rotatably connected with the first slider, and the rotating shaft of the corresponding one of the first grinding rollers passes through the first slider and is also connected with corresponding one of the driving parts in a transmission way; the first sleeve is threaded and sleeved outside the lead screw, and one end of the lead screw is coaxially and fixedly connected with a rotating shaft of the first servo motor.

2. The concentration device for coal water slurry according to claim 1, wherein the second sliding adjustment part comprises a second cavity and two third chutes, wherein the second cavity is arranged in bottoms of the fourth brackets, and the two third chutes are respectively arranged on bottom surfaces and side surfaces of the fourth brackets; the second cavity is communicated with the two third chutes, a second slider is slidably connected in the second cavity; a bottom of the second slider passes through one of the third chutes and is also fixedly connected with a second sleeve; a rotating shaft of corresponding one of the first grinding rollers located at the lower parts of the fourth bracket passes through an other of the third chutes and is also rotatably connected with the second slider, and the rotating shaft of the corresponding one of the first grinding rollers passes through the second slider and is also connected with corresponding one of the driving parts in a transmission way; the second sleeve is sleeved outside the lead screw, and a transmission assembly is arranged between the second sleeve and the lead screw.

3. The concentration device for coal water slurry according to claim 2, wherein the transmission assembly comprises a third sleeve, wherein the third sleeve is axially slidably sleeved at one end of the lead screw, and the second sleeve is threadedly sleeved at an outer side of the third sleeve.

4. The concentration device for coal water slurry according to claim 2, wherein the pulverized coal particle size distribution mechanism comprises a third bracket, and the distribution shell is fixedly connected to the third bracket; one end of the distribution shell is fixedly connected with the fan, a top of the one end of the distribution shell is correspondingly arranged below the filter unit, and an other end of the distribution shell is fixedly connected with the filter; the airflow channel is formed in the distribution shell, and the fan and the filter are communicated through the airflow channel; the distribution box is fixedly connected to a bottom of an outer side of the distribution shell, and the plurality of pulverized coal troughs are sequentially arranged in the distribution box along a direction of the airflow channel; the plurality of pulverized coal troughs are respectively communicated with a bottom of the airflow channel, and bottoms of the plurality of the pulverized coal troughs are respectively communicated with discharging assemblies.

5. The concentration device for coal water slurry according to claim 4, wherein each of the discharging assemblies comprises a discharging pipe; the discharging pipe is vertically and fixedly communicated with a bottom of the distribution box, and a bottom end of the discharging pipe is fixedly connected with a second servo motor; a rotating shaft of the second servo motor penetrates into the discharging pipe and also fixedly penetrates a spiral stirring blade, and one side of a bottom of the discharging pipe is communicated with the stirrer.

6. The concentration device for coal water slurry according to claim 4, wherein sizes of the plurality of pulverized coal troughs increase in turn along a direction from the fan to the filter; and a bottom of one end of the distribution box facing the filter is provided with a water tank.

7. The concentration device for coal water slurry according to claim 1, wherein one end of the servo hydraulic cylinder is fixedly connected to the first bracket, an other end of the servo hydraulic cylinder is fixedly connected between the two fourth brackets; one side of each of the fourth brackets facing the servo hydraulic cylinder is fixedly connected with a sliding column; and the sliding column is slidably connected with the first bracket, and a sliding direction of the first bracket is parallel to a telescopic direction of the servo hydraulic cylinder.

* * * * *